Feb. 5, 1957  J. W. CURTIS  2,779,955
METHOD OF EXTENDING A RIVET BLANK
AROUND A HEADED MANDRIL STEM
Filed Oct. 15, 1952

Inventor
James W. Curtis
By his Attorney
Thomas J. Ryan.

2,779,955

METHOD OF EXTENDING A RIVET BLANK AROUND A HEADED MANDRIL STEM

James William Curtis, Birmingham, England, assignor to United Shoe Machinery Corporation, Flemington, N. J., a corporation of New Jersey Application October 15, 1952, Serial No. 314,906

Claims priority, application Great Britain November 7, 1951

1 Claim. (Cl. 10—27)

This invention relates to improvements in or relating to fastening assemblies suitable for use in blind riveting operations; the term "blind riveting" as used herein denoting a fastening procedure in which a hollow tubular rivet barrel, inserted in a hole extending through a work piece, is set at one side of the work by the action of a setting device (e. g. a headed mandril) which engages the rivet at that side of the work piece and projects out from the rivet at the other side of the work piece. This practice, sometimes referred to as "pop riveting," is extensively employed in the operation of securing together two work pieces where one side of the work is inaccessible to the operator. In particular, the present invention relates to a novel method for the production of blind riveting assemblies.

Blind riveting assemblies, heretofore commercially available, have presented certain drawbacks. It has been found impracticable to provide a rivet having a barrel portion with a bore of uniform, or substantially uniform, cross section throughout the length of said bore. This is due to the fact that such rivets are produced from cut-disk blanks that are subjected to a series of metal drawing operations which produce a bore of diminished diameter at the bottom end of the barrel. As a result of this non-uniformity, a snug fit about the cylindrical stem portion of the mandril, throughout any substantial length of the bore, is not obtained. Another factor contributing to a loose fit is the necessity for providing manufacturing tolerances to insure that when, in the mass production of "pop riveting" assemblies, the mandrils and the rivets are to be assembled every mandril stem can be readily introduced into its rivet. Absence of a snug fit in this respect also militates against consistent rivet setting, even when both rivet and mandril are made with considerable dimensional uniformity. Another disadvantage of presently obtainable "pop" type rivets is that when part of the stem portion of the mandril is left in the set rivet, the joint which is produced is not as tight or as strong against shearing strains as would be the case in the presence of a snug fit, because, in the former instance, the stem portion which remains in the barrel fails to rigidly reinforce the relatively thin and ductile metal which forms the barrel of the rivet; whereas if there is a snug fit between the mandril and the rivet, the entire joint is rigid, much as though a solid steel rivet had been employed. A further drawback is that it is not normally practical to insure that a joint, formed by use of a blind riveting assembly of the "pop rivet" variety, is completely water tight; it being frequently the case that, even where part of the stem portion of the mandril is left in the set rivet, and fits snugly within the rivet, water can nevertheless find its way into or through the joint between the mandril and the rivet. Also, it is difficult to insure, in any case where after setting of the rivet parting of the mandril takes place, leaving a head end portion of the mandril in the set rivet, that such head end portion shall be reliably retained in the set rivet and not liable to work loose and rattle about in an undesirable fashion (e. g. within an inaccessible compartment in an aircraft wing). In addition, it is sometimes maintained that a riveted joint made by the use of a blind riveting assembly of this type, particularly if viewed other than from the head or flange end of the rivet, does not provide as neat and pleasing an appearance as may be desired.

It is one of the objects of the present invention to provide an improved method of making a blind rivet assembly of the type referred to whereby an assembly may be produced in which the stem portion of the mandril fits snugly throughout the entire bore of the barrel portion of the rivet regardless of any size variation between different sections of the mandril stem.

Another object of the invention is to provide a method of making a blind riveting assembly by the use of which a strong water tight riveted joint can readily be obtained.

It is another object of the invention to provide an improved and novel method of producing a rivet assembly in which, after setting the rivet, the head end portion of the mandril is left in the set rivet and in which said end portion is reliably retained as a functional part of the rivet to re-enforce the rivet against destructive shearing stresses.

Heretofore it has been customary to use, for a blind riveting assembly, a mandril made from steel wire which is cold-forged by dies in a machine of the nail making type, and a rivet made from a thin sheet of ductile metal by a procedure in which a circular blank is initially punched out from a sheet; such blank being thereafter first formed, by a series of progressive drawing operations, into a closed-ended hollow rivet having a rounded head flange, and the closed end then being removed by a punching operation. Besides the difficulty of producing rivets having dimensional accuracy by this procedure, as much as 50% of the metal sheet stock from which the rivets are made is customarily wasted in the form of cutting and punching scrap. Adequate accuracy could of course be obtained by manufacturing the rivets, by turning or milling operations, from solid stock, but such operations are expensive to perform and add to the metal waste, thereby greatly increasing the cost of the riveting assembly. After the mandril and the rivet have been thus separately produced, in order to complete the assembly it has heretofore been additionally necessary that the mandril be inserted through the bore of the rivet barrel. This assembling operation if done by hand is very time-consuming and therefore costly, and if performed by a machine is likely to result in many imperfect or damaged assemblies due to the fact that the reduced diameter of the bore at the mandril receiving end of the rivet barrel may not register properly with the leading end of the mandril stem. It is therefore another object of this invention to provide a method whereby tubular rivets suitable for pop riveting assemblies may be cheaply and readily made in large numbers on a mass production basis with dimensional accuracy and with little or no waste in the form of scrap metal.

Still another object is to provide a method whereby the necessity for inserting the mandril through the completed rivet barrel is avoided; the headed mandril being in this case inserted or assembled with the rivet unit during an intermediate phase in the forming of the rivet.

In carrying out my novel method, use is made of a manufacturing plant comprising three automatically operating machines; a first machine operates upon wire stock to produce billets in the form of cylinders, or substantially cylindrical pellets; a second machine operates upon these pellets to produce intermediate cup-shaped elements, and, after annealing, these elements, which constitute the rivet blanks, are subjected to an extruding operation in a machine which also assembles a headed mandril with a blank in such a manner that the head of the mandril is disposed within the cup-shaped recess of the blank so that during extrusion the metal flows around the head and along a portion of the mandril as a result of which the head is completely enveloped in the metal of the blank, and also metal of the blank is extruded into a tubular formation surrounding a portion of the mandril stem. In the resultant blind riveting assembly, the tubular formation is a snug fit around that part of the stem portion of the mandril enclosed by the rivet barrel, having been forced into tight engagement with said part of the stem by the pressure required for extrusion; part of the stem of the mandril projects from one end of the rivet and the head of the mandril is totally enveloped in the metal of the rivet, the arrangement being such that relative movement cannot take place between the rivet and mandril without an accompanying upsetting deformation of the assembly, the rivet assembly resembling one integral piece of metal.

Blind riveting may be effected with the above described assembly in the following manner. The rivet is inserted in a hole extending through the assembled work pieces in such a way that part of the rivet (including that part in which the head of the mandril is enveloped and part of the barrel of the rivet) projects from an inaccessible side of the work, and then the free projecting part of the stem of the mandril is pulled (by a suitable rivet setting device) while the rivet is held against bodily movement relative to the work. On such pulling the head of the mandril moves within the rivet to upset the latter at said inaccessible side of the work, and the projecting part of the mandril is then broken or trimmed off flush, leaving a head end portion of the mandril firmly retained within the set rivet. The resulting riveted joint is water tight since there is no hole through the set rivet; the portion of the mandril left in the set rivet is reliably retained therein and cannot separate from the rivet without considerable deformation of the latter, and the joint has a neater and more pleasing appearance than a riveted joint obtained by using riveting assemblies which have been heretofore obtainable.

Where the riveting assembly is to be used for joining work pieces which will not be subjected to shearing stresses, but on the other hand may be subjected to a substantial force tending to pull or tension them apart, it may be desirable to pull the entire mandril, including its head portion, out and free from the rivet of the rivet. The advantage to be obtained by this latter practice is that the wide mandril head in being drawn through the bore of the rivet will expand the barrel causing it to be forcibly wedged into tight contact with the walls of the work pieces.

In accordance with some of the above-stated objects, one of the several features of this invention is that consistently good rivet setting is assured by the ability to produce rivets of uniform size and configuration. This may only be attained by accurately controlling the volume of the metal in the blank from which the rivet is to be formed, and to this end, instead of employing metal stock in the form of a rod having the same diameter as the desired diameter of the pellet or blank to be shaped into a rivet, I initially employ a strand of wire having a diameter of only 50% to 80% of the desired diameter of the blank. By means of a well-known type of machine for heading nails, an individual measured length of metal wire, such as aluminum, is first fed into the die cavity of the machine. This length is then subjected to axial pressure, while allowing transverse flow of the metal to produce a disk-shaped head having a substantially greater diameter, but shorter length than the original length of wire. This head portion is then sheared off from the rest of the wire strand stock to form a pellet blank for the subsequent shaping and rivet forming operations. The volumetric accuracy of pellet blanks thus formed is far more consistent than when the pellets are produced by simply shearing off measured lengths of cylindrical rod stock. This is so because in shearing a piece of metal, and in particular a ductile metal such as aluminum, the sheared surface areas are always quite irregular in that they do not present smooth-cut or uniform surfaces. While this characteristic of metals, when sheared, cannot be overcome, it will be readily realized that the tendency for the volume of metal to vary in any given piece which has been sheared will be in proportion to the area of the irregular surface created by the shearing operation. Thus, by reducing the diameter of this irregular surface, as by shearing wire stock instead of rod, the discrepancy in the volumes of the resulting pellets will be very greatly diminished. Another advantage, when using wire, is that to attain any given volume in the severed length it will be necessary to feed a far greater length of initial stock than in the case where relatively thick rod stock is employed. It will also be apparent that, where a longer length is involved, slight inaccuracies in the measuring operation will not effect as great a variance in the resultant volume of the stock fed as where the length fed is quite small but the thickness of the stock substantially greater.

The above and other features of the invention will now be described in detail with reference to the accompanying drawings, in which Figs. 1, 2, 3 and 4 illustrate consecutive operating stages in the production of a metal pellet from which a rivet may be shaped, said stages being represented as carried out in a wire heading machine;

Figure 1:
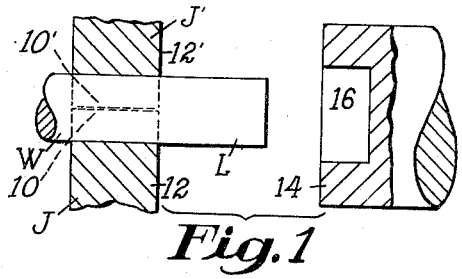

Referring to Fig. 1, in carrying out the illustrative method wire W, of light metal such as aluminum alloy, of substantially circular cross section is supplied to a first machine having opposed gripping jaws J, J', and means (not shown) for feeding the wire to the jaws step by step. One of the jaws J, is fixed while the other, J', executes, in the operation of the machine, limited movement relative to the jaw J to grip or release the wire W in timed relationship to the feed of the wire. The jaw J has a semi-circular groove 10 which cooperates with a similar groove 10' in the jaw J' so that when the wire W lying along the grooves 10, 10' is gripped between the jaws there is no substantial gap between the flat end faces 12, 12' respectively in the jaws. The machine referred to also comprises a spring-operated heading tool 14, having a cylindrical recess 16.

Figure 2:
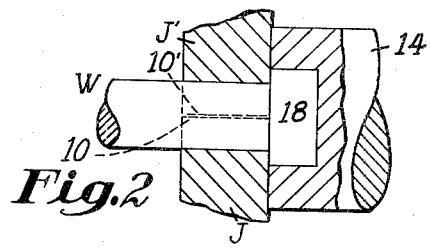
Figure 3:
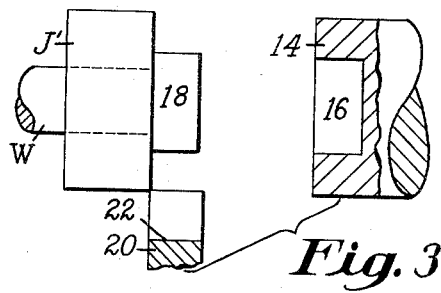
Figure 4:
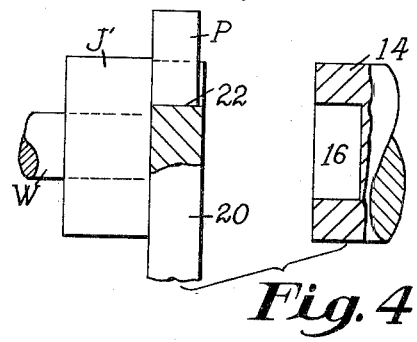
Figure 5:
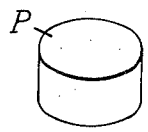
Fig. 5 shows the pellet from which the rivet is produced.

The first machine automatically performs the following cycle of operations: first the jaw J' is moved a little away from the jaw J and the wire is fed forward along the grooves 10, 10' until a portion L projects beyond the faces 12, 12' of the jaws, as shown in Fig. 1. Next the jaw J' is urged toward the jaw J to grip the wire and, while the wire is so gripped, the tool 14 makes a stroke to the left from a rest position shown in Fig. 1 towards the jaws into the position shown in Fig. 2, the projecting portion L of the wire being thus subjected to axial pressure between the jaws and the tool 14. However, the recess 16 is of larger diameter than the wire so that the metal of the wire can flow transversely, the portion L being thus formed into a cylindrical head 18 which is shorter than the original length of the portion L but of greater transverse dimensions. The tool 14 is then withdrawn to its rest position, after which a shearing block 20, Figs. 3 and 4, having a semicircular recess 22 to accommodate a portion of the head 18 and operating in timed relationship to movement of the jaws, moves across the face 12 and engages the head 18 in such a manner that the latter is received into the recess 22, after which further movement of the block 20 causes the head 18 to be sheared from the wire to constitute a cylindrical pellet P, as shown in Fig. 5. The pellet P drops into a suitable receptacle (not shown), after which the block 20 retracts, the jaw J' moves away from the jaw J and the wire W is again fed forward between the jaws, the cycle of operations being repeated to produce another pellet. The jaw J', the feeding means, the tool 14 and the block 20 are suitably actuated so that, in carrying out the illustrative method, pellets like the pellet P are produced automatically from the wire at a rate of hundreds a minute.

If desired, the pellet P may be next annealed by maintaining it at between 380° and 480° centigrade for about a half hour, to counteract any work hardening of the metal that may have taken place.

Figure 7:
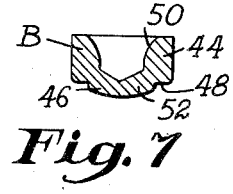
Fig. 7 shows a partially shaped rivet blank as produced by the second machine.
Figure 6:
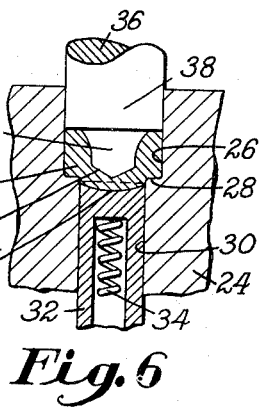
Fig. 6 shows another stage, in which a second machine is used, in carrying out the illustrative method.
Figure 9:
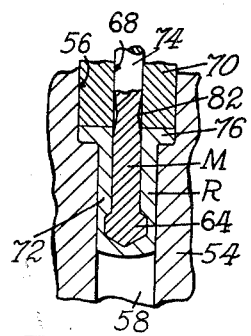
Fig. 9 shows the final stage in which the third machine has completed a rivet assembly, said assembly being illustrated.

The pellet P is then supplied to a second machine which comprises a die 24 shown in Fig. 6. The die 24 has a cylindrical bore 26 of the same diameter as the pellet P, there being at one end of the bore 26 an annular shoulder 28 which occurs at the junction of the bore 26 with a second adjoining cylindrical bore 30 coaxial with the bore 26 and of greatly reduced diameter; the bores 26, 30 may be regarded as constituting a die cavity. A plunger 32 forms a close sliding fit within the bore 30 and is normally held in a rest position in which a central point 35 of a shallow depression in the plunger 32 lies below the shoulder 28. When in this position, the plunger 32 can be displaced against the action of a strong compression spring 34. Operating in the bore 26 is a plunger 36 comprising a cylindrical stem 38, which forms a close sliding fit in the bore 26, and an integral projection member 40. This projection member 40 is in the form of a nipple extending axially downward from the end of the stem 38 and the lower extremity 42 of this nipple member is conic for a reason which will become apparent from the description relative to subsequent stages of operation. Referring to Fig. 6, the automatic cycle of operations in the second machine is as follows: first the plunger 36 is removed to an inoperative position and then the pellet P is automatically fed into the bore 26, in which it fits closely, the plunger 32 at this time occupying its rest position. The plunger 36 is then advanced by power during an operative stroke of the machine to cause the pellet to be subjected to pressure by the plunger 36, the member 40 entering the pellet P and displacing part of the metal of the pellet into the bore 30 as shown, the advance of the plunger 36 continuing down to the position as shown in Fig. 6. The metal of the pellet P now entirely fills the space within the bores 26, 30 between the plungers 32, 36 and the plunger 32 has been caused to yield a very small distance, against the compression spring 34, by pressure of the metal of the pellet. The pellet P is thus formed into an intermediate blank B of the shape shown in Fig. 7, viz., comprising a cylindrical portion 44 adjoining a cylindrical portion 46 of smaller external diameter than the portion 44, an annular shoulder 48 occurring at the junction of the portions 44, 46 and a cup-like recess extending from the upper end of the portion 44 into, but not through the portion 46, the blank B thus having a closed end portion 52 remote from the portion 44. The blank is next ejected from the die 24, by the plunger 32, into a suitable receptacle (not shown), the parts shown in Fig. 6 being suitably actuated so that, in carrying out the method, elements like the blank B are produced automatically from the supply of pellets P.

Next, in carrying out the illustrative method, the metal of the blank B is annealed, in the same manner as before.

Figure 8:
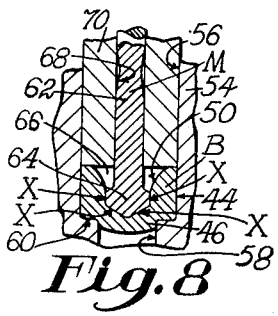
Fig. 8 shows a later stage, in which a third machine is used, in carrying out the method.

The blank B is then introduced into a die 54, having two cylindrical bores 56, 58, as shown in Fig. 8, the bore 56 being of such a size that the cylindrical surface 44 fits snugly therein and the bore 58 being smaller than the bore 56 and of such a size that the projection 46 fits snugly therein. The bores 56, 58 are joined by a flat annular shoulder 60.

A mandril M, having a stem 62 and a head 64, made by a procedure in which wire stock is cold forged between dies in a machine of nail making type, is then assembled with the blank B in such a manner that the head 64 of the mandril lies in the recess 50, the head of the mandril being formed in the same shape as the extremity 42 of the plunger 40, by which the recess in the blank was shaped. Thus it will be seen that when assembled the head 64 will fit snugly within the bottom of the recess as shown by the arrows X, X but a part of the stem portion while lying within the recess does not contact with the blank and is surrounded by an annular space 66. Part of the mandril stem portion 62 extends into a bore 68 (in which the stem portion 62 forms a close sliding fit) in the plunger 70 which also forms a close sliding fit with the bore 56.

The blank B is now subjected to pressure by a downward movement of the plunger 70, the die 54 remaining stationary. As a result of the mandril M being assembled with the blank B in the manner described and illustrated, metal of the blank is forced into the lower portion of the space 66 so that the head 64 is totally enveloped in metal of the blank. As the plunger 70 continues its downward pressure metal of the blank is extruded into a tubular formation 72 (to form a rivet R) through an annular orifice between the shoulder 60 and the stem portion 62 of the mandril, it being understood that the mandril is tensioned downward by the flow of metal from above through said orifice so that, as such extrusion takes place, the mandril moves downward relative to both the die 54 and the plunger 70 with the result that the tubular formation 72 is formed around the mandril stem portion 62. This tubular formation 72, which constitutes the tubular barrel of the rivet R forms a snug fit upon the stem portion 62 of the mandril, having been forced into snug engagement with the stem portion by the pressure required for extrusion. The stem portion 62 is sufficiently long for a part 74 thereof to project from the rivet R at one end of the latter. The rivet R has an annular head flange 76 which is circular and of the same diameter as the former portion 44 of the blank B. As will be clear, the rivet R is one piece of metal in which the head 64 of the mandril is totally enveloped, the arrangement being such that relative movement cannot take place between the rivet R and the mandril M without deformation of the assembly such as is accomplished in the setting operation.

Figure 10:
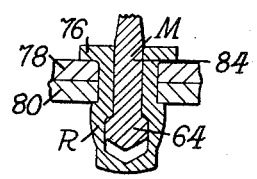
Fig. 10 shows a riveted joint made by use of the illustrative assembly.

Referring now to Fig. 10, blind riveting may be effected, using the assembly produced by the foregoing described method, in the following manner. The rivet R is inserted in a hole extending through two assembled horizontal plates 78, 80 (the underside of which plates will be considered as inaccessible) in such a way that part of the metal of the rivet which envelops the head 64 and part of the barrel portion 72 of the rivet, project below the work. The head flange 76 of the rivet is then held forcibly against the work by the nose piece of a conventional suitable rivet setting gun to hold the rivet against bodily movement relative to the work and the projecting part 74 of the stem portion of the mandril is then pulled in the customary manner. As a result of such pulling the mandril head 64 moves within the rivet to upset the latter at the underside of the work, after which the mandril stem breaks outside the work at a weakened neck portion 82, leaving a head end portion 84 of the mandril within the barrel of the set rivet with a small part of the stem projecting beyond the head flange 76. The projecting part may, if desired, then be trimmed off flush with the flange by use of a suitable cutting or grinding tool.

While, for the purpose of illustration, the assembly produced by my novel method has been described as having the form and shape represented in the drawings, it is to be understood that the invention is in no way to be construed as limited to the making of a fastening having component parts similarly formed and shaped. That is to say, in regard to the rivet blank, the bottom of the cup-shaped recess may be formed with a different contour if it is desired to assemble therein a mandril having a head shaped differently than that illustrated. Also the dies of the extrusion machine may be variously altered, without departing from the scope of the present invention, so as to form a rivet having any desired flange shape at the head end of the rivet. It is also to be understood that the stem of the mandril need not be provided with a reduced neck portion 82 as illustrated, for in some cases it may be desired to set the assembly with a gun which has cutters for severing the projecting stem portion from the set rivet. In other cases the neck portion 82 may be variously located to produce a popping of the mandril at any desired position either within or beyond the rivet barrel. The present embodiment is therefore to be considered in all respects as illustrative and not restrictive, the scope of the invention being indicated by the appended claim rather than by the foregoing description, and all changes which come within the meaning and range of equivalency of the claim is therefore intended to be embraced therein.

What is claimed and is desired to be secured by United States Letters Patent is:

The method of making a blind rivet assembly of the type described, which includes the steps of: positioning a blank provided with a cup-like recess open end up within the bore of a confining die having a diameter equal to that of the finished rivet flange and provided with an annular bottoming shoulder defining a constricted central opening forming an extrusion orifice for the flow of blank material from said die and having a diameter equal to that of the finished rivet barrel; assembling a rivet setting mandril, having an enlarged head with a stem of lesser diameter extending therefrom, with said head located wholly within the recess of the blank and below the uppermost side portions thereof, said stem being telescopically fitted within a coaxial bore of an extrusion plunger; subjecting the blank to pressure applied parallel to said stem by said plunger; depressing and displacing those portions of the blank which extend above the head of said mandril inwardly of the circumference of said head and against said stem to fill the recess and to interlock snugly the head within the material of the blank, whereby portions of said displaced material of the blank extend in direct alinement between said extrusion plunger and said head in the direction of applied pressure; further depressing said material and mandril concomitantly by continued pressure applied by the plunger to the material above said head, to cause said head and the material there surrounding to pass through said opening; then extruding material of the blank through the then-annular orifice between the mandril stem and said shoulder of the die, progressively withdrawing successive portions of the mandril stem from the bore of said plunger while causing flow of the material in tubular form around said successive portions of the mandril stem as the stem is advanced through said opening.

References Cited in the file of this patent
UNITED STATES PATENTS

| | | |
|---|---|---|
| 376,224 | Babbitt | Jan. 10, 1888 |
| 672,040 | Neider | Apr. 16, 1901 |
| 868,111 | Neider | Oct. 15, 1907 |
| 1,821,301 | Gibson | Sept. 1, 1931 |
| 1,921,654 | Burbank | Aug. 8, 1933 |
| 2,385,831 | Mullgardt | Oct. 2, 1945 |
| 2,392,797 | Hackett | Jan. 8, 1946 |
| 2,393,564 | Poupitch | Jan. 22, 1946 |
| 2,426,422 | Torreson | Aug. 26, 1947 |
| 2,562,336 | Selden | July 31, 1951 |
| 2,572,246 | Colley et al. | Oct. 23, 1951 |